US012754353B2

(12) United States Patent
Sugimoto et al.

(10) Patent No.: US 12,754,353 B2
(45) Date of Patent: Oct. 6, 2026

(54) EXTERIOR MEMBER

(71) Applicant: KAWASAKI MOTORS, LTD., Akashi (JP)

(72) Inventors: Daisuke Sugimoto, Tokyo (JP); Mitsuru Kobayashi, Akashi (JP)

(73) Assignee: KAWASAKI MOTORS, LTD., Akashi (JP)

( * ) Notice: Subject to any disclaimer, the term of this patent is extended or adjusted under 35 U.S.C. 154(b) by 377 days.

(21) Appl. No.: 18/229,557

(22) Filed: Aug. 2, 2023

(65) Prior Publication Data

US 2024/0045120 A1 Feb. 8, 2024

(30) Foreign Application Priority Data

Aug. 3, 2022 (JP) ................................ 2022-123840

(51) Int. Cl.
*G02B 5/124* (2006.01)
*B62J 6/20* (2006.01)

(52) U.S. Cl.
CPC ................ *G02B 5/124* (2013.01); *B62J 6/20* (2013.01)

(58) Field of Classification Search
None
See application file for complete search history.

(56) References Cited

U.S. PATENT DOCUMENTS

| | | | | |
|---|---|---|---|---|
| 5,614,286 | A * | 3/1997 | Bacon, Jr. | B29C 39/148 359/530 |
| 6,972,147 | B1 * | 12/2005 | Wei | G02B 5/128 525/461 |
| 2005/0139434 | A1 * | 6/2005 | Nakaie | B62L 1/005 188/71.1 |
| 2018/0230328 | A1 * | 8/2018 | Nakagawa | C09D 5/00 |
| 2022/0055708 | A1 * | 2/2022 | Sato | B29C 45/1418 |

FOREIGN PATENT DOCUMENTS

| | | | |
|---|---|---|---|
| JP | S59-075849 | A | 4/1984 |
| JP | S60-261748 | A | 12/1985 |
| JP | S61-132445 | A | 6/1986 |
| JP | 2009-126184 | A | 6/2009 |
| JP | 2013-095216 | A | 5/2013 |

* cited by examiner

*Primary Examiner* — Jyotsna V Dabbi
(74) *Attorney, Agent, or Firm* — PROCOPIO, CORY, HARGREAVES & SAVITCH LLP

(57) ABSTRACT

There is provided an exterior member having a light transmitting property. The exterior member includes a reflective design portion having unevenness provided on a front surface portion of the exterior member. The unevenness reflecting light from a light source disposed around the reflective design portion. The exterior member according to the present disclosure can produce a design by reflection and a design by transmission depending on several situations. As a result, one design member can be used to express two different designs, and a new design expression can be obtained.

13 Claims, 8 Drawing Sheets
(3 of 8 Drawing Sheet(s) Filed in Color)

EXTERIOR MEMBER

CROSS-REFERENCE TO RELATED APPLICATIONS

This application is based on and claims priority under 35 USC 119 from Japanese Patent Application No. 2022-123840 filed on Aug. 3, 2022, the contents of which are incorporated herein by reference.

TECHNICAL FIELD

The present application relates to an exterior member that forms an appearance of a product.

BACKGROUND ART

JP2009-126184A discloses an exterior structure which accentuates an appearance of a vehicle and improves a design property of the appearance by covering an outer side of the vehicle with a resin-made cover member and providing an appearance member having a color and made of a material different from those of the cover member. A new design expression may be required for exterior parts in order to increase a degree of attention.

SUMMARY OF INVENTION

Disclosure of the present application provides an exterior member from which a new design expression can be obtained.

According to an illustrative aspect of the present disclosure, an exterior member having a light transmitting property, includes: a reflective design portion having unevenness provided on a front surface portion of the exterior member, the unevenness reflecting light from a light source disposed around the reflective design portion.

According to the exterior member of the present disclosure, irradiation light from the light source around the exterior member is reflected by the reflective design portion provided on the front surface portion. Accordingly, an amount of light reflected by the front surface portion may be greater than an amount of emitted light transmitted through an interior of the exterior member. In this case, an observer who observes the exterior member recognizes the reflected light greatly, and easily recognizes an uneven shape of the front surface portion as a design shape. In contrast, when the irradiation light from the light source is blocked or when a point of view of the observer changes, the amount of light reflected by the front surface portion may be relatively smaller than the amount of light emitted from the transmitted light. In this case, the light transmitted through the exterior member has a greater influence on the observer. In this case, it is possible to recognize a design obtained by the transmitted light, which is different from the design obtained by the reflected light. Thus, according to the present disclosure, it is possible to produce a design by reflection and a design by transmission depending on a situation. That is, one design member can be used to express two different designs, and a new design expression can be obtained.

BRIEF DESCRIPTION OF DRAWINGS

The patent or application file contains at least one drawing executed in color. Copies of this patent or patent application publication with color drawing(s) will be provided by the Office upon request and payment of the necessary fee.

DESCRIPTION OF EMBODIMENTS

Figure 1:
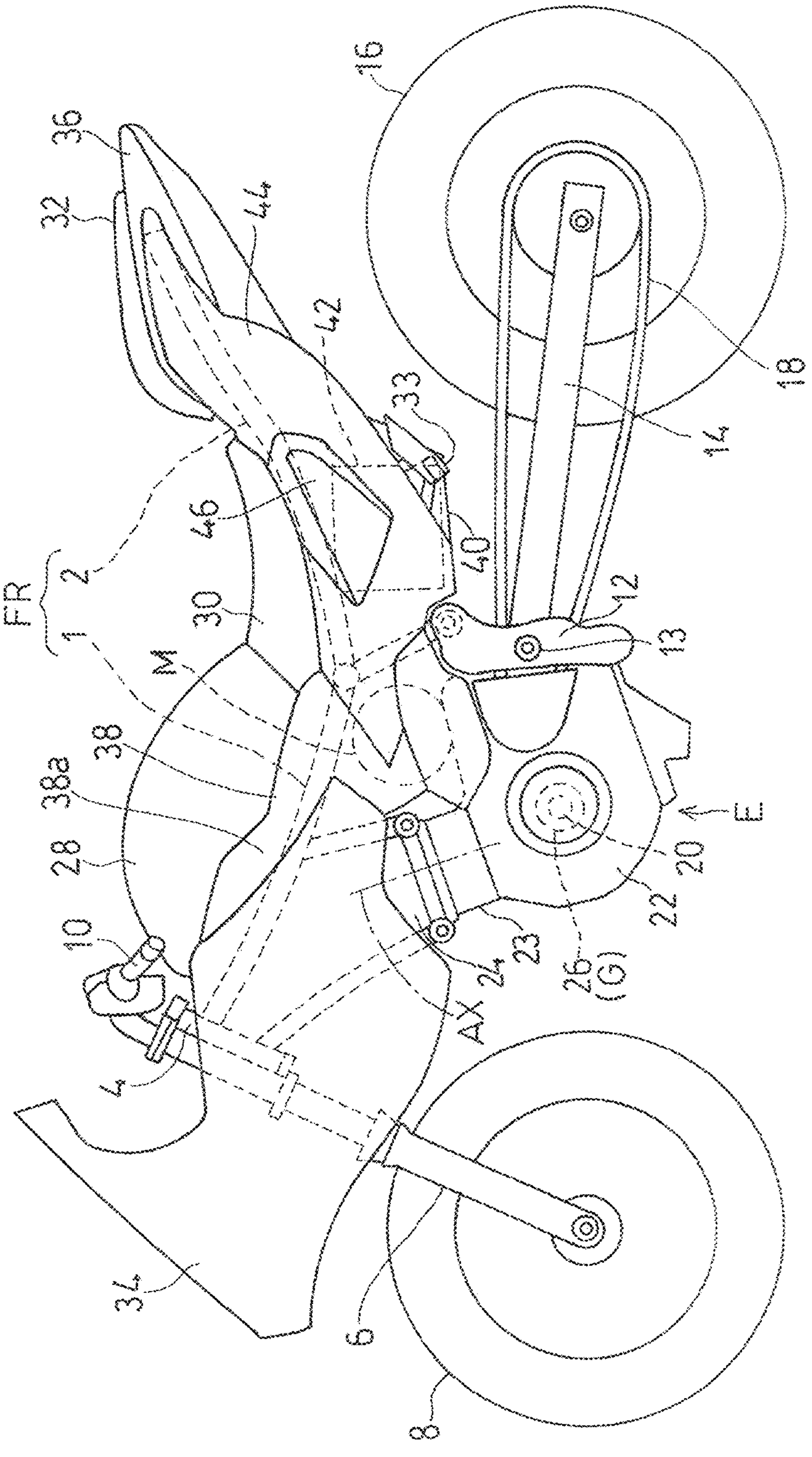
FIG. 1 is a side view showing a motorcycle, which is a type of vehicle, provided with an exterior part including an exterior member according to a first embodiment of the present disclosure.

Hereinafter, a preferred embodiment of the present disclosure will be described with reference to the drawings. FIG. 1 is a side view showing a motorcycle, which is a type of vehicle, provided with an exterior part including an exterior member according to a first embodiment of the present disclosure. In the present description, “right” and “left” refer to “right” and “left” as viewed from a driver riding in a vehicle. That is, a left-right direction coincides with a vehicle width direction. In addition, “front” and “rear” refer to “front” and “rear” in a traveling direction of the vehicle. That is, a longitudinal direction of a vehicle body coincides with a front-rear direction of the vehicle. An inner side in the vehicle width direction refers to a side facing a center line of the vehicle body extending in the front-rear direction, and an outer side in the vehicle width direction of the vehicle body refers to a side away from the center line of the vehicle body.

The motorcycle according to the present embodiment is a hybrid vehicle having an engine E as a first source of travel power and a motor M for travel as a second source of travel power. That is, the motorcycle according to the present embodiment travels only by the engine E, which is an internal combustion engine, travels only by the motor M, which is an electric motor, or travels using the engine E and the motor M at the same time, depending on driving conditions. However, the motorcycle is not limited to a hybrid vehicle, and may be an engine vehicle driven by an engine or an electric vehicle driven by an electric motor.

A vehicle body frame FR of the motorcycle includes a main frame 1 constituting a front half portion and a rear frame 2 forming a rear half portion. The main frame 1 extends rearward and obliquely downward from a head pipe 4 at a front end, and then curves downward and extends in an upper-lower direction. The rear frame 2 extends rearward from the main frame 1.

A front fork 6 is supported by the head pipe 4. A front wheel 8 is supported by a lower end portion of the front fork 6, and a handle 10 is attached to an upper end portion of the front fork 6.

A swing arm bracket 12 is provided at a rear end portion of the main frame 1. A swing arm 14 is supported by the swing arm bracket 12 so as to be vertically swingable around a pivot shaft 13. A rear wheel 16 is attached to a rear end portion of the swing arm 14.

The engine E is disposed between the front wheel 8 and the rear wheel 16 below the main frame 1 and is supported by the vehicle body frame FR. Power of the engine E is transmitted to the rear wheel 16 via a power transmission member 18, so that the rear wheel 16 is driven. The power transmission member 18 is, for example, a drive chain. However, the power transmission member 18 is not limited to the drive chain.

The engine E includes a crank shaft 20 extending in the vehicle width direction, a crank case 22 rotatably supporting the crank shaft 20, a cylinder 23 protruding upward from the crank case 22, and a cylinder head 24 above the cylinder 23. In the present embodiment, an axis AX of the cylinder 23 is inclined upward and forward.

Above the crank case 22 and behind the cylinder 23, the motor M is disposed. When motor power is transmitted to an input shaft on a downstream side of a clutch, the motor power is transmitted as a drive force for traveling. When the clutch is disengaged, traveling can be made by a motor alone. When the clutch is engaged, traveling can be made by using both a motor and an engine. When the clutch is engaged and the motor power is stopped, traveling by engine can be made.

A generator 26 is provided on one side of the crank shaft 20, which is one end in an axial direction, that is, on a left side in the present embodiment. The generator 26 generates electric power from the power of the engine E, that is, by rotation of the crank shaft 20.

A fuel tank 28 is disposed on an upper portion of the main frame 1, and a driver seat 30 on which a driver is to be seated and a passenger seat 32 on which a passenger to be seated are mounted to the rear frame 2. The fuel tank 28 is disposed directly above the engine E, behind the head pipe 4 and in front of the driver seat 30.

A resin-made front cowl 34 is provided in the front half portion of the vehicle body. The front cowl 34 in the present embodiment covers a side region with respect to the engine E from a region in front of the head pipe 4. A pair of resin-made rear cowls 36 on left and right are provided behind the front cowl 34. The rear cowl 36 covers a gap between the driver seat and the passenger seat 32 and the rear frame 2 from an outer side.

A pair of knee grip portions 38 on left and right are provided below the fuel tank 28. In the present embodiment, the knee grip portion 38 is implemented by with a knee grip cover. The knee grip cover 38 covers a front lower region with respect to the driver seat 30 from the outer side. The knee grip cover 38 is formed with a recessed portion **38*a* which is recessed to the inner side in the vehicle width direction with respect to the rest of the knee grip cover 38. The recessed portion 38*a*** forms a knee grip part held between knees of the driver during traveling.

A rear fender 40 is provided below the rear cowl 36 and above the rear wheel 16. The rear fender 40 prevents muddy water and the like splashed up by the rear wheel 16 from entering the inside of the vehicle body. The rear fender 40 is made of a resin, for example. A battery 42 is placed on an upper surface of the rear fender 40. The battery 42 is disposed below the driver seat 30 and behind the engine E.

An output of the generator 26 is supplied to the battery 42 to charge the battery 42. The electric power charged in the battery 42 is supplied to a ISG motor G (integrated starter generator motor), which also serves as the above-described generator 26, to drive the ISG motor G. The battery 42 can output a large current in order to provide an output necessary for driving the traveling. The battery 42 in the present embodiment is a 48 V lithium ion battery. However, the battery 42 is not limited to this.

A pair of rear covers 44 on left and right that cover a rear portion of the vehicle body from the outer side in the vehicle width direction are attached to the rear portion of the vehicle body. In the present embodiment, the rear cover 44 extends from a region below the driver seat 30 to a region below the passenger seat 32, and covers the battery 42, the rear fender 40 and a part of the rear cowl 36 from the outer side. The front cowl 34, the rear cowl 36, and the rear cover 44 form an exterior part that covers the vehicle body from the outer side.

A part of the rear cover 44 is formed of a resin-made light transmitting part 46, which has a light transmitting property to visible light. The light transmitting part 46 is one of exterior members of the vehicle exposed to the outside of the vehicle body. The light transmitting part 46 is made of a material having a light transmitting property, which is an ABS resin (acrylonitrile butadiene styrene/copolymer synthetic resin) in the present embodiment. Accordingly, light can be transmitted into the rear cover 44 or light can be emitted from the rear cover 44. For this reason, a content accommodated in the rear cover 44 is visible. In the present embodiment, the light transmitting part 46 is formed of a translucent material.

More specifically, the light transmitting part 46 is made translucent by adding a colorant to a base light transmitting material. Specifically, the light transmitting part 46 has a low transmittance to visible light due to internal absorption of a part of the transmitted light by the colorant. For example, the colorant may be added such that the transmittance is 20% or less, and preferably 10% or less. In the present embodiment, the light transmitting part 46 is added with a black colorant in addition to the light transmitting material. Accordingly, the light reflected in the rear cover 44 is transmitted through the light transmitting part 46, and is viewed as being cloudy black as a whole. Therefore, a shape of the content in the rear cover 44 cannot be viewed clearly.

In the present embodiment, the transmittance is set to such an extent that when an observer brings the line of sight close to the light transmitting part, a color, a brightness, a rough outline, etc. of the light transmitting part is visible. By using a translucent material in this way, it is possible to make it difficult to see the content that adversely influences aesthetics. In addition, it is possible to omit a surface treatment on the content so as to improve the aesthetics, or to omit a cover part covering the content in order to prevent deterioration of the aesthetics. The light transmitting part 46 may be formed of a transparent material. That is, the light transmitting part 46 may be formed with a transmittance of 80% or more. In this way, the content in the rear cover 44 may be clearly visible.

In the present embodiment, the light transmitting part 46 is detachably attached to the rear cover 44 by a fastening member such as a bolt. However, the attaching structure for the light transmitting part 46 is not limited to this. The light transmitting part 46 may be fixed by, for example, a rivet, an engaging structure, a fitting structure, or an adhesive.

In the present embodiment, the light transmitting part 46 is disposed on the rear cover 44 at a position facing the battery 42 in the vehicle width direction. That is, the light transmitting part 46 is disposed on a side surface of the vehicle body and positioned on an outer side of the battery 42 in the vehicle width direction. In this way, when the light transmitting part 46 is disposed at a position corresponding to the battery 42, the observer can easily remember the battery 42 disposed on an inner side of the light transmitting part 46.

In the present embodiment, the light transmitting part 46 is disposed in a region below the driver seat 30 and above the swing arm 12. Therefore, a portion of the vehicle body where the light transmitting part 46 is disposed is a portion which may be touched by a part of the body of the driver, such as a leg, when the driver straddles the driver seat 30. In addition, the light transmitting part 46 is disposed between the driver seat 30 and a tandem step 33 in the upper-lower direction. Therefore, the portion is portion which may be touched by a part of the body of the passenger, such as a leg, when the passenger straddles the passenger seat 32. In addition, the light transmitting part 46 is disposed on a portion on an inner side of the foot of the passenger in a riding posture.

The light transmitting part 46 is not limited to being disposed as in the present embodiment, and may be disposed on another portion of the rear cover 44 or may be disposed on any portion of the front cowl 34 or the rear cowl 36.

Figure 2:
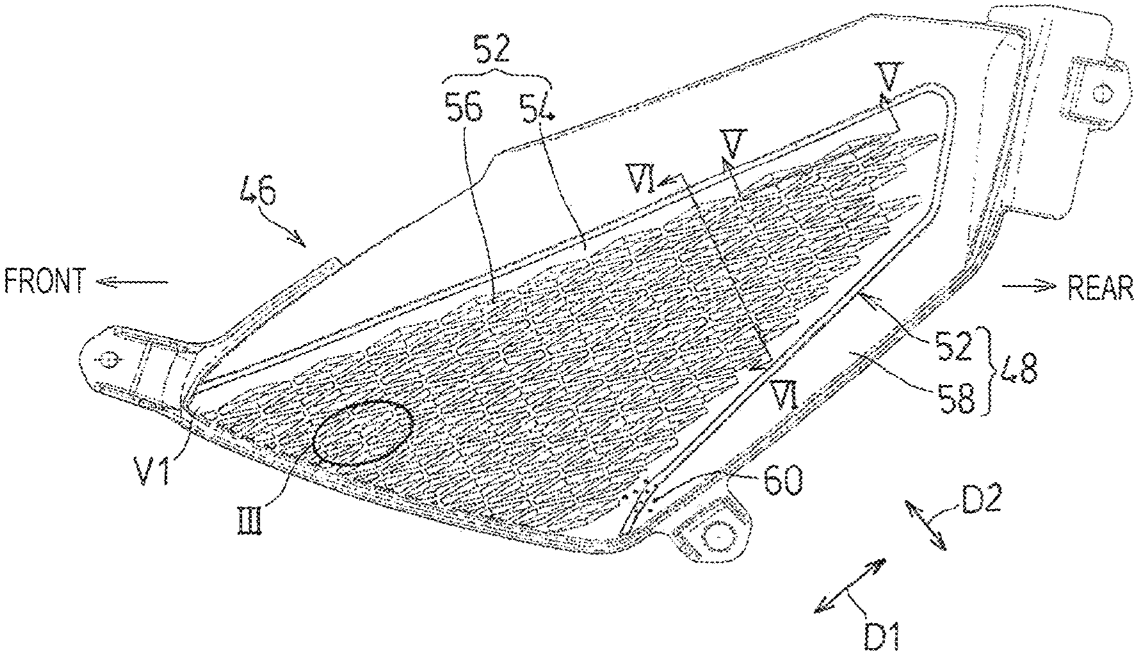
FIG. 2 is a diagram showing a front surface portion of the exterior member.
Figure 3:
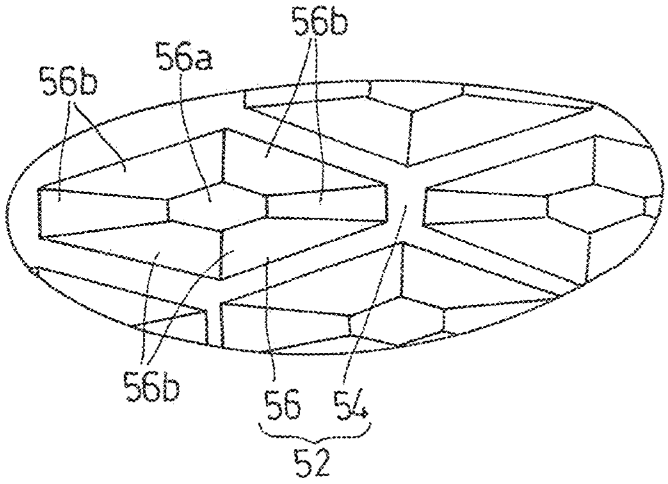
FIG. 3 is an enlarged view of a part III in FIG. 2.
Figure 4:
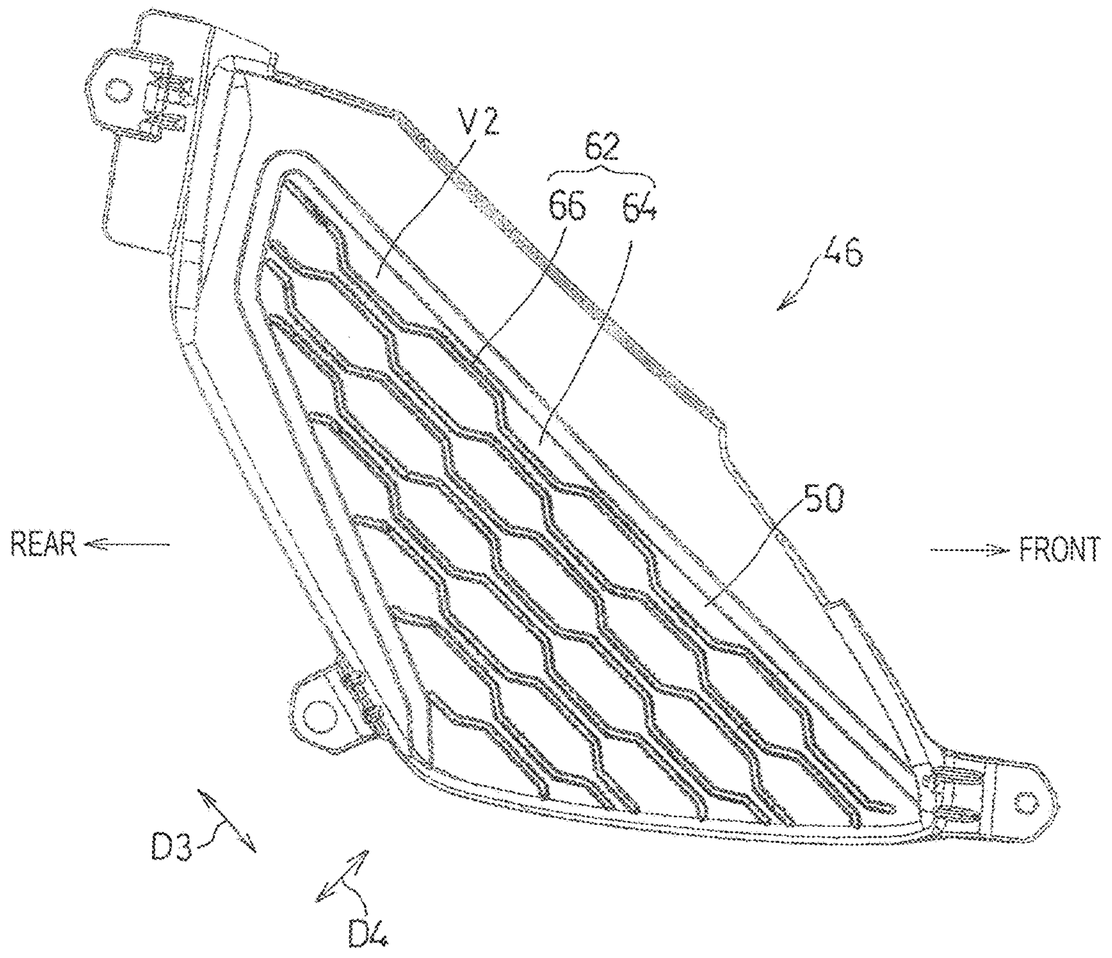
FIG. 4 is a diagram showing a back surface portion of the exterior member.
Figure 5:
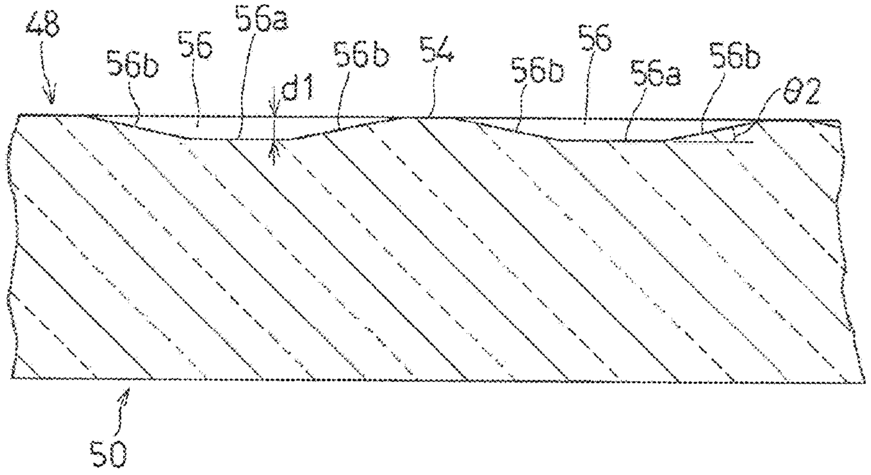
FIG. 5 is a cross-sectional view taken along a line V-V in FIG. 2.
Figure 6:
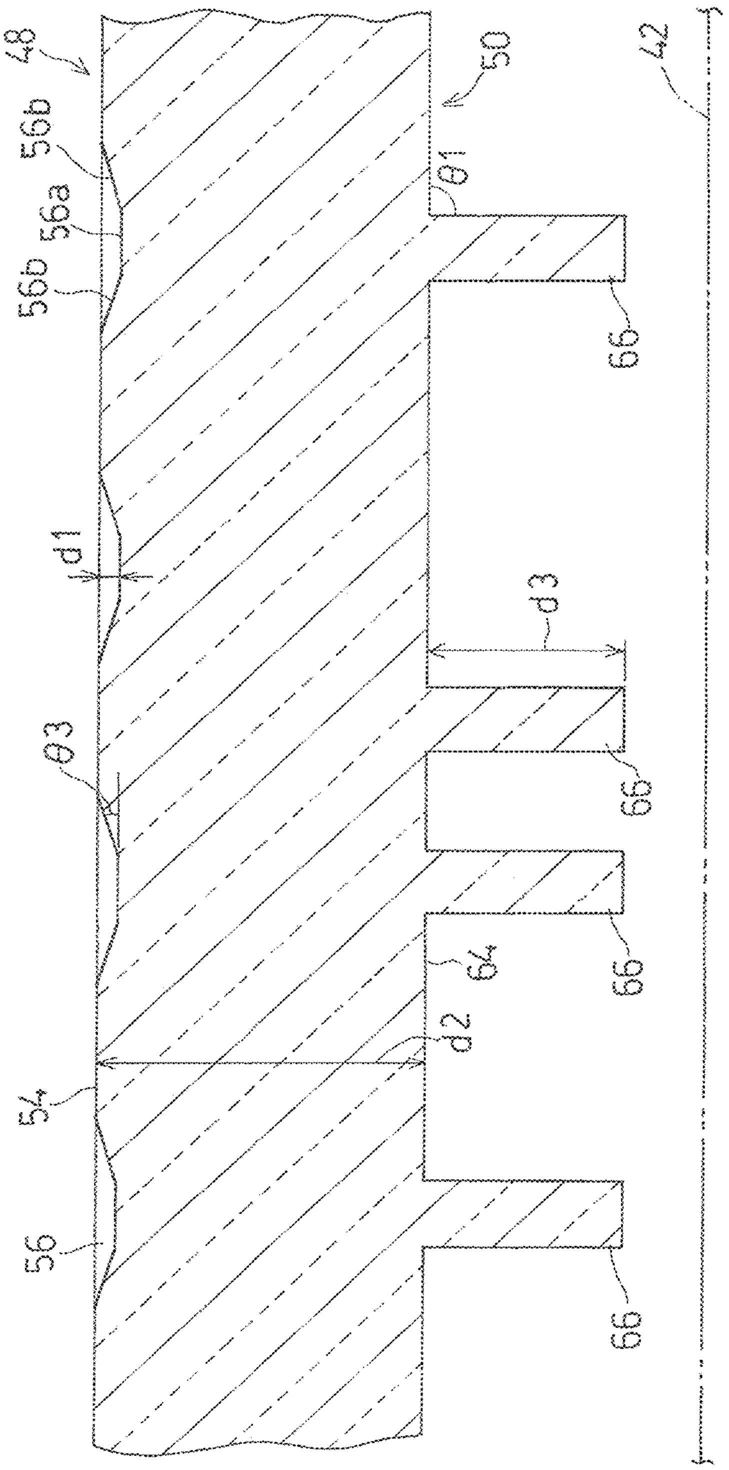
FIG. 6 is a cross-sectional view taken along a line VI-VI in FIG. 2.

FIG. 2 shows a front surface portion 48 of the light transmitting part 46. FIG. 3 is an enlarged view of a part III in FIG. 2. FIG. 4 shows a back surface portion 50 of the light transmitting part 46. FIG. 5 is a cross-sectional view taken along a line V-V in FIG. 2. FIG. 6 is a cross-sectional view taken along a line VI-VI in FIG. 2. Here, the front surface portion refers to a surface facing the outer side when mounting the light transmitting part 46 on the vehicle body, and the back surface portion refers to a surface facing the inner side when mounting the light transmitting part 46 on the vehicle body. That is, the front surface portion is exposed to the outside of the vehicle body. The back surface portion is a portion facing an interior space of the vehicle body and is not exposed to the outside of the vehicle body.

As shown in FIG. 2, the front surface portion 48 includes a reflective design portion 52 having a design surface on which unevenness is formed. The reflective design portion 52 has the unevenness expressed as a design by reflecting, on the design surface on which the unevenness is formed, light from a light source disposed around. Specifically, the reflective design portion 52 includes a base portion 54 and retraction portions 56 which retract from the base portion 54 to an inner side in a thickness direction, i.e., the inner side in the vehicle width direction.

The base portion 54 is a portion forming an outermost surface of the reflective design portion 52 in the thickness direction and extends along a flat virtual plane V1. The virtual plane V1 may be formed on a flat plane, or may be formed on a curved plane with a large radius of curvature. Each of the retraction portions 56 is a portion in which recesses are formed with respect to the base portion 54. A design is expressed by a recess shape of the retraction portion 56. In the present embodiment, the retraction portion 56 is formed in a pattern in which a plurality of single motifs are arranged. Specifically, the design is expressed by arranging a plurality of recesses. In the present embodiment, a lattice design is formed in which the recesses are arranged in a predetermined first direction D1 and in a second direction D2 orthogonal to the first direction D1. In the present embodiment, the first direction D1 is a direction extending along the rear frame 2 (FIG. 1), and is set in a direction upward from a front end to the rear.

In the present embodiment, the retraction portion 56 is a hexagonal recessed portion arranged in plural in the first direction D1 and the second direction D2 when viewed from the outer side in the thickness direction. Accordingly, a plurality of hexagonal patterns appear on the front surface portion 48.

More specifically, one recessed portion is formed with a plurality of inclined surfaces facing in different directions, as will be described later. Accordingly, when light is incident from a light source disposed around, reflected light reflected from any one inclined surface of the plurality of inclined surfaces is likely to be recognized as strong light by the observer. In the present embodiment, as will be described later, one recessed portion is formed with inclined surfaces composed of six different planes, whereby the reflected light can reach the observer more easily. In addition, each inclined surface is formed at an angle of less than degrees with respect to the virtual plane V1 along which the base portion 54 extends. Specifically, each inclined surface is preferably formed at an angle of less than 30 degrees, and more preferably less than 10 degrees, with respect to the virtual plane V1. Accordingly, it is possible to prevent the recess from becoming deep, and to make the inclined surface visible from the outer side in the thickness direction relatively large, thereby making it easier for the reflected light to reach the observer.

In the present embodiment, the shape of one recess is formed sufficiently smaller than the body of the driver. In addition, the base portion 54 is disposed around the recesses and is formed flush with a plane along the virtual plane V1. An inclination angle is formed to be less than 10 degrees. Accordingly, even when the body of the driver rubs against the front surface portion of the light transmitting part 46, it is possible to prevent the driver from being caught by the unevenness on the front surface portion. In addition, in the present embodiment, by forming into the recess, even when an area of a deep portion of the recess is relatively small, it is easier to prevent catching than a case where the recess is expressed by a protrusion portion. However, the retraction portion 56 is not limited to being hexagonal, and may be, for example, another polygonal shape, or may be formed in any recess shape such as a circular or elliptical shape.

As shown in FIG. 3, each hexagon of the retraction portion 56 includes a deepest portion **56*a* and a plurality of inclined portions 56*b*. The deepest portion 56*a* is positioned at a center of a hexagon on an outer edge of the retraction portion 56. The base portion 54 and the deepest portion 56*a* of the retraction portion 56 are smoothly connected to each other by the inclined portions 56*b*. In the present embodiment, six inclined portions 56*b*** are disposed corresponding to the number of sides of the hexagon.

A depth d1 of the deepest portion **56*a* shown in FIG. 5 is 0.5 mm or less, and in the present embodiment is about 0.3 mm. In this way, the retraction portion 56 of the front surface portion 48 is not very deep. Accordingly, it is possible to prevent dust from accumulating in the retraction portion 56 or to reduce rigidity of the front surface portion 48. In FIG. 5 and FIG. 6, the depth d1 is exaggerated from the actual depth in order to clarify the shape of the retraction portion 56. In addition, by deepening only a portion of the retraction portion 56, that is, only the deepest portion 56*a*, the inclined surfaces 56*b*** can reflect light from a light source around, such as sunlight, while making the appearance deep. An operation and effect of a reflection will be described later.

The front surface portion 48 further includes, apart from the reflective design portion 52, a flat portion 58 which has no uneven shape or design. The flat portion 58 does not have an uneven shape as the reflective design portion 52. In the present embodiment, as shown in FIG. 2, the flat portion 58 is disposed around the reflective design portion 52 so as to surround the reflective design portion 52.

The front surface portion 48 further includes an embossed structure 60. The embossed structure 60 is a wrinkled pattern, a satin finish, or the like whose surface is subjected to embossing. In the present embodiment, the embossed structure 60 is disposed on the entire front surface portion 48, i.e., both the reflective design portion 52 and the flat portion 58.

The flat portion 58 is set to form an embossed structure coarser than that of the reflective design portion 52. In other words, the flat portion 58 is formed such that the surface formed by embossing scatters more light than the reflective design portion 52. In the present embodiment, an embossed structure having fine meshes is also formed on the reflective design portion 52. The embossed structure formed on the reflective design portion 52 is set to an embossed structure that does not excessively scatter light on the surface.

Although FIG. 2 shows the embossed structure 60 only on a portion of the front surface portion 48, it is actually disposed on the entire front surface portion 48. The embossed structure 60 may be disposed on only one of the reflective design portion 52 and the flat portion 58. The embossed structure 60 may be omitted.

When the embossed structure 60 is disposed on the front surface portion 48, it is possible to avoid the content in the rear cover 44 from being clearly visible. In addition, when forming an embossed structure or adding a color pigment, an amount of light incident toward the battery 42 on the inner side of the rear cover 44 can be reduced. Accordingly, it is easy to prevent a temperature rise of the battery 42 when the vehicle is stopped. In addition, even when the body of the driver or the passenger comes into contact with the front surface portion 48, disposing the embossed structure 60 makes scratches or stains on the front surface portion 48 inconspicuous. The light transmitting part 46 may be disposed to avoid a portion to be in contact with the body of the driver, and the embossed structure 60 on the front surface portion 48 may be omitted.

As shown in FIG. 4, the back surface portion 50 includes a transmissive design portion 62 having a design surface on which unevenness is formed. The transmissive design portion 62 has the unevenness expressed as a design by reflecting, on the design surface on which the unevenness is formed, transmitted light on a back surface side of the light transmitting part 46. Specifically, the transmissive design portion 62 includes a base portion 64 and rib portions 66 protruding from the base portion 64 to the thickness direction, that is, the inner side in the vehicle width direction.

The base portion 64 is a portion forming an innermost surface of the transmissive design portion 62 in the thickness direction and extends along a flat virtual plane V2. The virtual plane V2 may be formed on a flat plane, or may be formed on a curved plane with a large radius of curvature. Each of the rib portions 66 is a portion in which protrusion portions are formed with respect to the base portion 64. A design is expressed by a protrusion portion shape of the rib portion 66. In the present embodiment, the rib portion 66 is formed in a pattern in which a plurality of single motifs are arranged. Specifically, a design is expressed by arranging a plurality of protrusion portion shapes.

In the present embodiment, a lattice design is formed in which the protrusion portions and recesses are arranged in a predetermined third direction D3 and in a fourth direction D4 orthogonal to the third direction D3. In the present embodiment, the third direction D3 coincides with the above-described first direction D1, is a direction extending along the rear frame 2, and is set in a direction upward from the front end to the rear. The third direction D3 and the fourth direction D4 are respectively set in the same direction as the first direction D1 and the second direction D2 of the front surface portion, whereby the transmissive design portion 62 and the reflective design portion 52 have a common design. In addition, one motif expressed by the transmissive design portion 62 is larger than one motif expressed by the reflective design portion 52, that is, expressed in a larger region. In the present embodiment, the motif of the transmissive design portion 62 is formed to have a size suitable for regions of the plurality of recesses formed in the reflective design portion 52.

In the present embodiment, the rib portion 66 is a plurality of hexagonal protrusion portions. That is, the back surface portion 50 is provided with a plurality of hexagonal patterns. However, the rib portion 66 is not limited to being hexagonal. The transmissive design portion 62 having the rib portion 66 can partially change an amount of light transmitted through the light transmitting part 46.

In other words, an amount of light reflected by the rib portion 66 and emitted from the front surface portion is smaller than an amount of light reflected by the base portion 64 and emitted from the front surface portion. Accordingly, a partial difference (i.e., shades of colors) occurs in an amount of light reflected on the back surface portion, which is expressed as a design surface. An angle θ1 (FIG. 6) of the rib portion 66 is preferably 80° or more.

The transmissive design portion 62 is formed with a greater change in unevenness than the reflective design portion 52. Specifically, as will be described later, the transmissive design portion 62 is formed to have an amount of unevenness greater than that of the reflective design portion 52 with respect to the unevenness forming the design. In addition, the transmissive design portion 62 is formed at an angle steeper than that of the reflective design portion 52.

When a pattern is formed of such protrusion portions, the partial difference in the amount of light reflected on the back surface portion is increased, and the hexagonal shape of the transmissive design portion as the design becomes darker and more conspicuous. In addition, the rib portion 66 also functions as a reinforcing member, increasing the rigidity of the light transmitting part 46. Therefore, the rib portion 66 preferably extends in a longitudinal direction of the light transmitting part 46. Forming the pattern with protrusion portion tends to prevent an increase in a plate thickness d2 of the light transmitting part 46 as a whole, compared to a case where the pattern is formed of recessed portions.

In the present embodiment, the hexagon formed of the rib portion 66 of the back surface portion 50 is larger than the hexagon formed of the retraction portion 56 of the front surface portion 48. In addition, a protrusion amount d3 of the rib portion 66 of the back surface portion 50 is larger than the depth d1 of the deepest portion 56*a* of the front surface portion 48 (d3>d1). In the present embodiment, the protrusion amount d3 of the rib portion 66 is about 3 mm. In addition, an inclination angle θ2 in the longitudinal direction of the retraction portion 56 of the front surface portion 48 in FIG. 5 is about 1.7°, and an inclination angle θ3 in a lateral direction of the retraction portion 56 of the front surface portion 48 in FIG. 6 is about 6°. That is, the inclination angle of the back surface portion 50 is also larger than that of the front surface portion 48 (θ1>θ2 and θ1>θ3).

By changing the color of a cured resin, the light transmitting parts 46 with colorful expressions can be implemented. In addition, by disposing a LED lamp inside the light transmitting part 46, that is, on the inner side of the light transmitting part 46 in the vehicle width direction, a part that emits light can be implemented.

Next, an operation and effect of the light transmitting part 46 according to the present embodiment will be described with reference to FIGS. 7A and 7B.

Figure 7A:
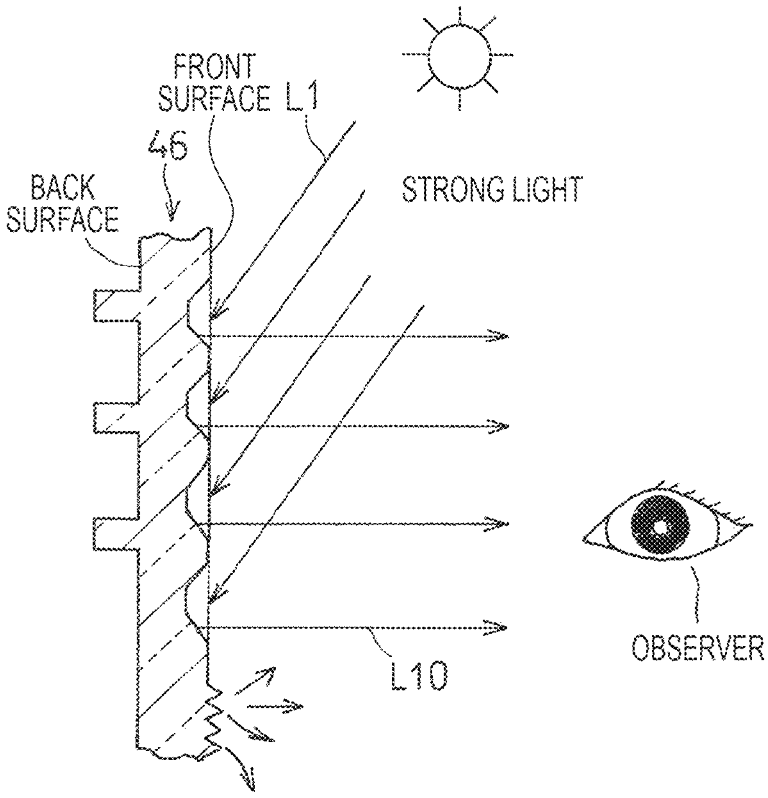
FIG. 7A is a schematic diagram showing a state in which the exterior member is exposed to strong light.

As shown in FIG. 7A, when reflection on an inclined surface of the front surface portion is strong, an amount of transmitted light is reduced, making the design of the front surface portion more conspicuous. Reference number L1 in FIG. 7A is incident light, and reference number L10 is reflected light. An example where a strong reflection on the inclined surface of the front surface portion occurs is a case where an amount of light from a light source is strong, such as in the daytime, an angle between the inclined surface, the light source, and a point of view is just right, the amount of light from the light source is extremely small, or the like.

Figure 7B:
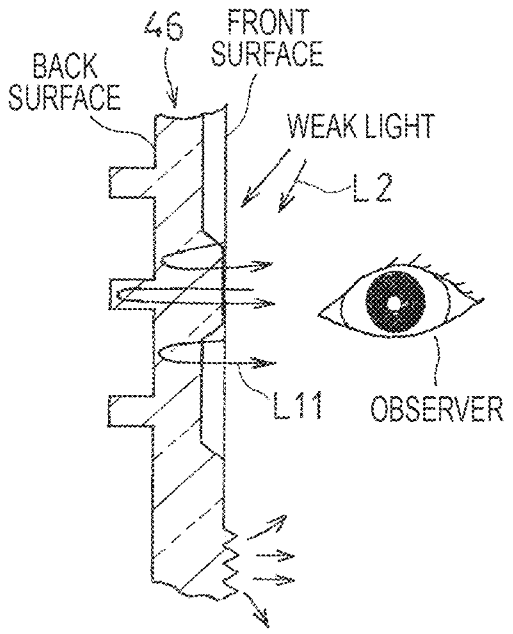
FIG. 7B is a schematic diagram showing a state in which the exterior member is exposed to weak light.

As shown in FIG. 7B, when the reflection on the inclined surface of the front surface portion is not strong, the amount of the transmitted light increases, making the design on the back surface portion more conspicuous. Reference number L2 in FIG. 7B is incident light, and reference number L11 is reflected light. An example where a strong reflection on the back surface portion occurs is a case where the amount of light of the light source is weak, such as at night, the observer blocks the light source while observing from a closer distance, the angle between the inclined surface, the light source, and the point of view is not appropriate, a separate light source is disposed at an inner side, or the like.

The appearance is likely to change depending on a degree of light scattering due to the embossed structure of the front surface portion, and a degree of absorption and scattering of a coloring material. In addition, it is possible to create a region in which the design on the back side is partially visible and a state in which the design on the front side is partially visible. By using various design expressions of such a light transmitting part 46, it is possible to achieve an unprecedented appearance of the vehicle.

Specifically, as described above, the design that the light transmitting part 46 appears can be changed depending on a difference between an angle at which the light is incident and an angle at which the observer views. More specifically, when the rib portion 66 is formed on the back surface portion 50 of the light transmitting part 46 to change a thickness and an amount of reflected light on the front surface portion 48 is relatively small, the design corresponding to the rib portion is can be visible. In this way, depending on how the light is incident, there can be two appearances, i.e., a case where the design of the back surface portion 50 is visible, and a case where the design of the front surface portion 48 is visible.

In order to make the design of the transmissive design portion 62 conspicuous, a steep rib portion 66 may be formed on the back surface portion 50. In this case, when the light transmitting part 46 is formed by molding, formation of a steep rib is likely to cause sink marks, i.e., surface dents, due to a difference in resin shrinkage after molding. In the present embodiment, by forming an uneven shape also on the back surface portion 50, even when sink marks occur on the back surface portion 50 due to the formation of the rib portion 66, it is possible to prevent the sink marks from becoming conspicuous and to avoid impairing the appearance of the product compared to a case where the back surface portion is formed flat.

Further, since the embossed structure 60 is disposed on the front surface portion 48 in addition to the uneven shape, even when the light transmitting part 46 is used, details of the content can be made difficult to view. Accordingly, the design expressed by the light transmitting part 46 can be made conspicuous. In addition, the coloring material added to the embossed structure 60 and the light transmitting part 46 reduces an amount of light transmitted to the inner side of the light transmitting part 46. Accordingly, prevention of an internal temperature rise and prevention of penetration of ultraviolet rays into the interior can be achieved.

In this way, by eliminating the need for structural members other than the light transmitting part 46, the observer can be made to recognize two types of designs, i.e., the front surface portion 48 and the back surface portion 50, depending on the situation, and diversification of design expressions can be achieved. The front surface portion 48 and the back surface portion 50 having these uneven shapes are formed by molding in the present embodiment. In this way, both designs can be formed by one-time processing, and a production cost can be reduced.

In the transmissive design portion 62, since the rib portion 66 absorbs more light than the base portion 64, the rib portion 66 looks darker. Therefore, a shape of the transmissive design portion 62 of the back surface portion 50 can be made more conspicuous than the case where the base portion 64 looks darker. In addition, with the rib portion 66, while preventing an increase in thickness of the light transmitting part 46, it is possible to achieve both improvement in rigidity and implementation of the transmissive design portion 62.

A height d3 of the rib portion 66 of the transmissive design portion 62 is greater than a depth of the retraction portion 56 of the reflective design portion 52. Accordingly, the shape of the transmissive design portion 62 can be made conspicuous. In addition, since an amount of unevenness of the reflective design portion 52 is reduced, dust, sand, and the like are less likely to accumulate on the front surface portion 48.

The light transmitting part 46 has the embossed structure 60 on the front surface portion 48. When a reflectance is increased by scattering light with the embossed structure 60, it is possible to increase a chance of recognizing the reflective design portion 52. In this way, when the amount of reflection is adjusted using the embossed structure 60, it is possible to adjust the chance of recognizing the reflective design portion 52 and the transmissive design portion 62, and to give the observer the intended recognition chance. For example, as the embossed structure 60 is increased to lower the transmittance, the chance of recognizing the transmissive design portion 62 can be reduced. In addition, as the embossed structure 60 is reduced to increase the transmittance, the chance of recognizing the transmissive design portion 62 can be increased.

The reflective design portion 52 incudes the base portion 54 and the retraction portions 56 which retract from the base portion 54 to the inner side in the vehicle width direction. Accordingly, compared to a case of protruding from the base portion 54 to the outer side in the vehicle width direction, resistance when the observer touches the light transmitting part 46 can be reduced, and texture can be made good.

When the light transmitting part 46 is used for a cowl member of the vehicle, two designs can be expressed with one part, and options for design expression can be increased while preventing an increase in the number of parts.

The present disclosure includes the following Aspects 1 to 10.

[Aspect 1]

According to an aspect 1, irradiation light from the light source disposed around the design member 46 is reflected by the reflective design portion 52 provided on the front surface portion 48. Accordingly, an amount of light reflected by the front surface portion 48 may be greater than an amount of light transmitted through an interior of the design member 46. In this case, an observer who observes the design member 46 recognizes the reflected light greatly, and easily recognizes a uneven shape of the front surface portion 48 as a design shape. In contrast, when the irradiation light from the light source is blocked or when a point of view of the observer changes, the amount of light reflected by the front surface portion 48 may be relatively small. In this case, the light transmitted through the front surface portion 48 of the design member 46 has a greater influence on the observer. In this case, it is possible to recognize a design obtained by the transmitted light, which is different from the design obtained by the reflected light. Thus, according to an aspect 1, it is possible to produce a design by reflection and a design by transmission depending on a situation. That is, one design member 46 can be used to express two different designs, and a new design expression can be obtained.

[Aspect 2]

According to an aspect 2, depending on the situation, in addition to the unevenness of the front surface portion 48, the transmissive design portion 62 of the back surface portion is visible by the observer due to an influence of the transmitted light. Accordingly, while eliminating the need for structural members other than the design member 46, the observer can be made to recognize two types of designs, i.e., the front surface portion 48 and the back surface portion 50, depending on the situation, and diversification of design expressions can be achieved.

[Aspect 3]

According to an aspect 3, in the transmissive design portion 62, since the rib portion 66 absorbs more light than the base portion 64, the rib portion 66 looks darker. Therefore, a shape of the transmissive design portion 62 of the back surface portion 50 can be made more conspicuous than the case where the base portion 64 looks darker. In addition, with the rib portion 66, it is possible to achieve both improvement in rigidity of the exterior member 46 and implementation of the transmissive design portion 62.

[Aspect 4]

According to an aspect 4, since an amount of unevenness of the transmissive design portion 62 is increased, a shape of the transmissive design portion 62 can be made conspicuous. In addition, since an amount of unevenness of the reflective design portion 52 is reduced, dust, sand, and the like are less likely to accumulate on the front surface portion 48.

[Aspect 5]

According to an aspect 5, when a reflectance is increased by the embossed structure it is possible to increase a chance of recognizing the reflective design portion 52. In this way, when the amount of reflection is adjusted using the embossed structure 60, it is possible to adjust the chance of recognizing the reflective design portion 52 and the transmissive design portion 62, and to give the observer the intended recognition chance. For example, as the embossed structure 60 is increased to lower the transmittance, the chance of recognizing the transmissive design portion 62 can be reduced. In addition, as the embossed structure 60 is reduced to increase the transmittance, the chance of recognizing the transmissive design portion 62 can be increased.

[Aspect 6]

According to an aspect 6, the transmissive design portion 62 can be made darker and the design by transmission can be made more conspicuous.

[Aspect 7] According to an aspect 7, compared to a case of protruding from the base portion 54 to the outer side, resistance when the observer touches the design member 46 can be reduced, and texture can be made good.

[Aspect 8]

According to an aspect 8, two designs can be expressed with one part, and options for design expression can be increased while preventing an increase in the number of parts.

[Aspect 9]

According to an aspect 9, an exterior member having a light transmitting property, includes: a front surface portion including a reflective design portion having unevenness; and a back surface portion including a transmissive design portion having unevenness different from the unevenness of the reflective design portion.

[Aspect 10]

According to an aspect 10, an exterior member having a light transmitting property, includes: a transmissive design portion provided on a back surface portion of the exterior member, and the transmissive design portion having unevenness being configured to partially change a transmission amount of light.

The present disclosure is not limited to the above embodiment, and various additions, modifications, and deletions can be made without departing from the gist of the present disclosure. In the above embodiment, an example in which the exterior member according to the present disclosure is applied to exterior parts of a motorcycle has been described, but the exterior member according to the present disclosure can also be applied to exterior parts of vehicles other than a motorcycle, such as a tricycle and a four-wheeled buggy. It may also be applied to other land vehicles such as a four-wheeled vehicle, water vehicles such as a planing boat, and flying vehicles. In a case of a vehicle, an amount of light from a light source around changes depending on whether the vehicle is irradiated with sunlight, and it is easy to achieve the implementation of the two types of designs described above. It may also be an exterior member for an industrial product other than a vehicle. For example, it may be an industrial product such as an ornament.

Any material can be used for the light transmitting part as long as the material has a light transmitting property. The light transmitting part may be made of a light transmitting resin material other than an ABS resin. The light transmitting part may be, for example, an acrylic resin (PMMA), a polycarbonate resin (PC), or other light transmitting resins.

In the above embodiment, the light transmitting part is translucent, but may be completely transparent. In other words, it may be configured to positively cause the content visible. In this case, it is possible to create a state in which the content in the cowl appears as a design, and a state in which the unevenness of the front surface portion appears as a design, and a new design expression can be obtained. In addition, since a region in which the rib portion 66 is formed and a region in which the rib portion is not formed are formed, three states can be obtained, for example, which are a state in which the content in the cowl appear as a design, a state in which the unevenness of the front surface portion appears as a design, and a state in which the unevenness of the back surface portion appears as a design. As a result various design expressions can be further obtained. Since at least part of the content in the cowl appears as a design, it is possible to confirm the presence or absence of a content in the cowl, for example. In addition, by forming the cowl translucent, it is possible to make it difficult to view the content that adversely influences aesthetics of the cowl.

In the above embodiment, the reflective design portion 52 and the transmissive design portion 62 are formed with designs by patterns, but the design represented by the unevenness is not limited to patterns, and may be letters or marks, for example. For example, unevenness indicating information indicating a product or a manufacturer may be formed on the transmissive design portion.

In the above embodiment, the light transmitting part 46 is disposed in the portion corresponding to the battery position so as to indicate the presence of the battery 42, but the position where the light transmitting part 46 is disposed is not limited to this. For example, when there is a part that has a notable function, the light transmitting part 46 may be disposed at a position corresponding to this component. For example, the light transmitting part 46 may be disposed at a drive motor mounting position or a supercharger mounting position. In addition, the present disclosure also includes a case where the light transmitting part 46 is mounted for the purpose of obtaining a new design property, not limited to a part having a new function.

When coloring the light transmitting part 46, in addition to black, the colorant may be an achromatic color such as white or gray, or a chromatic color such as green or red. In addition to the colorant, a glittering material such as aluminum flakes may be contained for internal scattering of transmitted light.

The light transmitting part 46 may be an exterior part having a flat back surface portion as long as it is a light transmitting part 46 having unevenness for forming a design on at least the front surface portion thereof. In this case, when light is transmitted, a design different from an unevenness design formed on the front surface portion can also be expressed.

In addition, the light transmitting part 46 may be an exterior part having a flat front surface portion as long as it is a light transmitting part having unevenness for forming a design on the back surface portion thereof. This also makes it possible to express different designs in a light transmitting state and a light reflecting state. Therefore, such a configuration is also included in the scope of the present disclosure.

Figure 8:
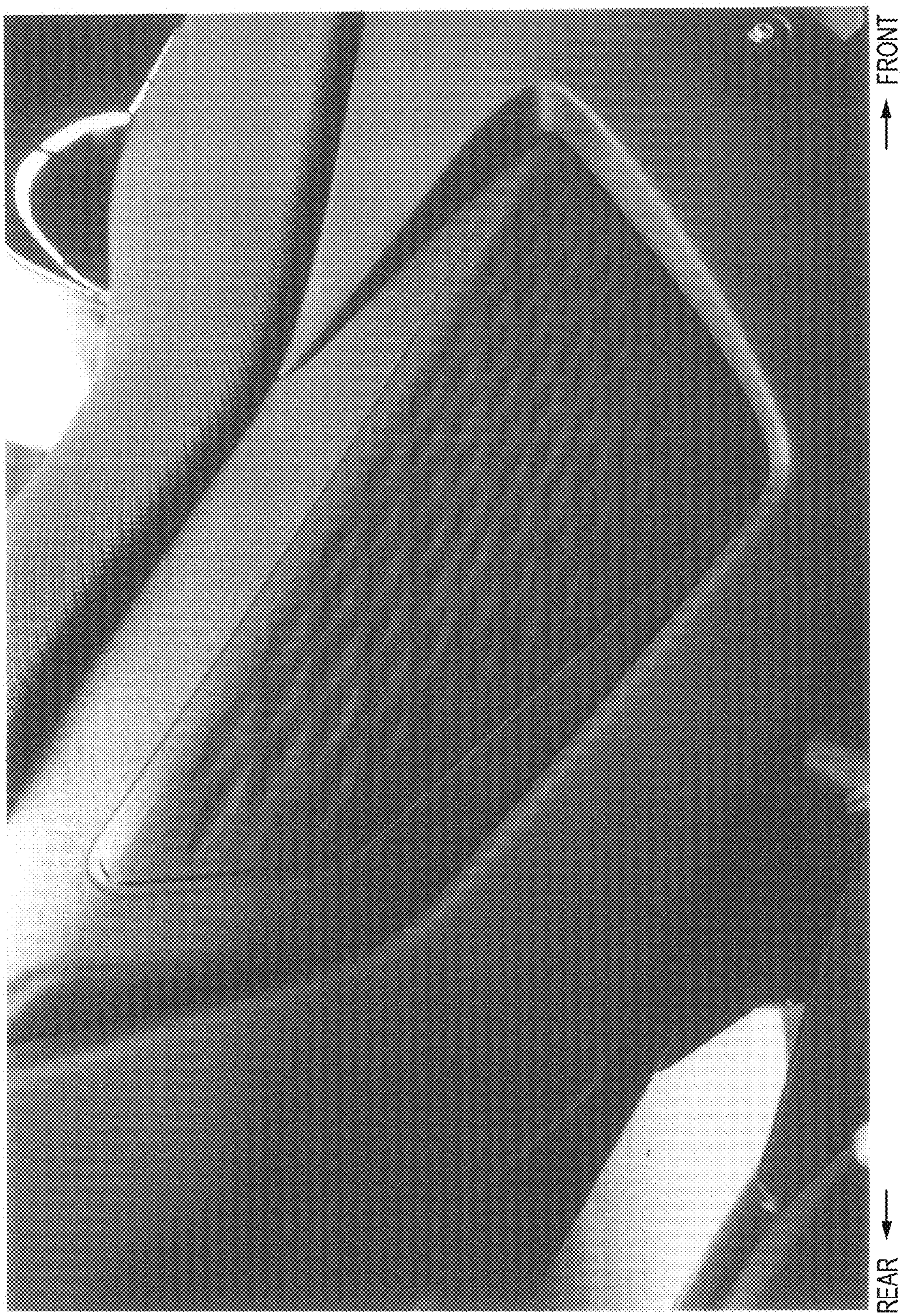
FIG. 8 is a view of illustrating a state where patterns of the front surface portion in FIG. 2 are visible.
Figure 9:
FIG. 9 is a view of illustrating a state where patterns of the back surface portion in FIG. 4 are visible.
Figure 10:
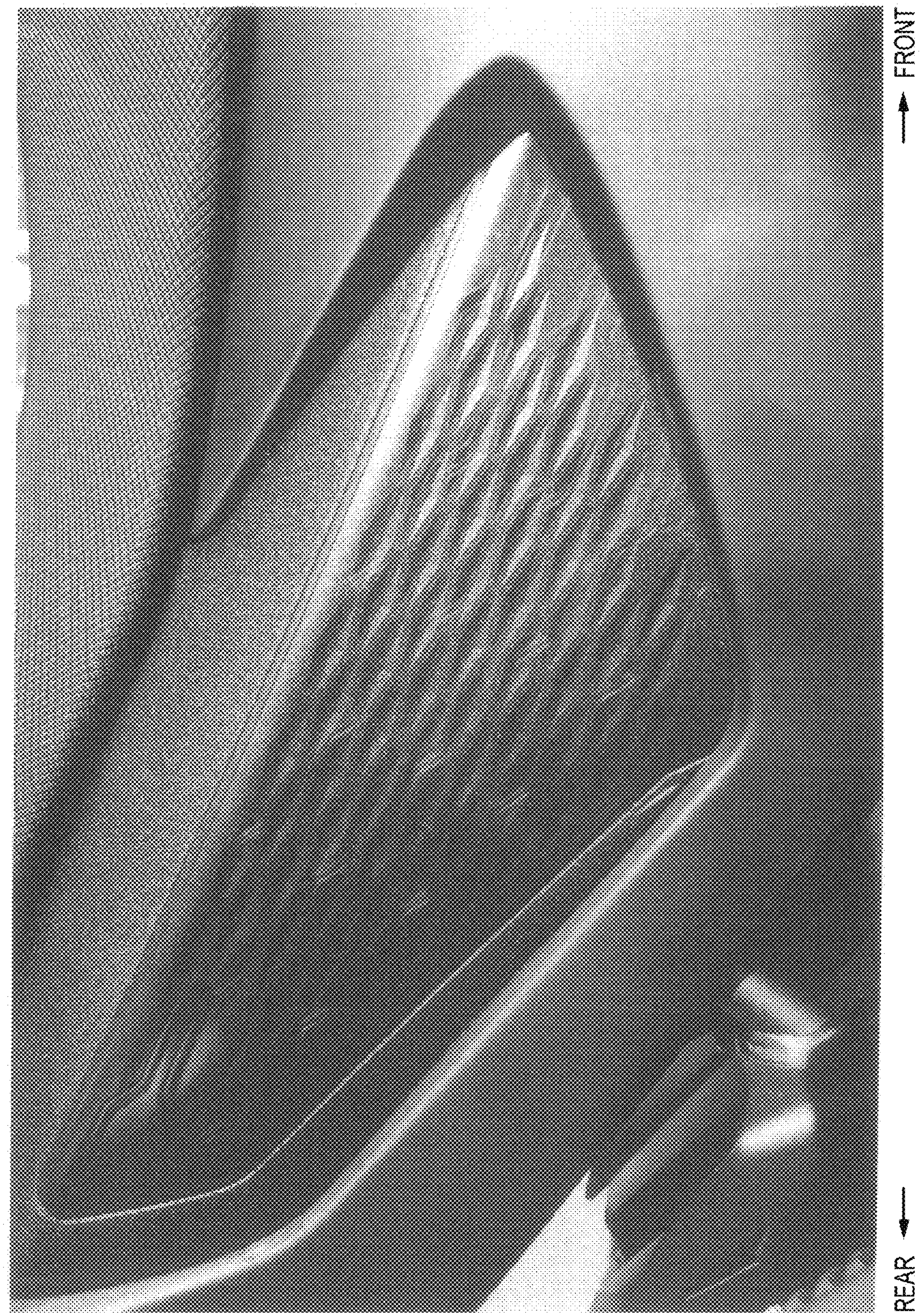
FIG. 10 is a view of illustrating a state where the patterns of the front surface portion in FIG. 2 are visible on a front side of the vehicle (i.e., a right side of FIG. 10), and the patterns of the back surface portion in FIG. 4 are visible on a rear side of the vehicle (i.e., a left side of FIG. 10).

For the sake of better understanding that the present disclosure provides the external member which can obtain the new design expression, FIGS. 8 to 10 are explained below.

FIG. 8 is a view of illustrating a state where patterns of the front surface portion in FIG. 2 are visible. FIG. 9 is a view of illustrating a state where patterns of the back surface portion in FIG. 4 are visible. And, FIG. 10 is a view of illustrating a state where the patterns of the front surface portion in FIG. 2 are visible on a front side of the vehicle (i.e., a right side of FIG. 10), and the patterns of the back surface portion in FIG. 4 are visible on a rear side of the vehicle (i.e., a left side of FIG. 10).

As illustrated in FIGS. 8 to 10, several appearances can be made depending on how the light is incident.

What is claimed is:

1. An exterior member having a light transmitting property, comprising:

a reflective design portion having unevenness provided on a front surface portion of the exterior member that is a side where light is incident from a light source located outside, the unevenness reflecting at least a part of light from the light source; and a transmissive design portion provided on a back surface portion of the exterior member that is an opposite side to the side where light is incident from the light source located outside, and the transmissive design portion having unevenness being configured to partially change a transmission amount of light, wherein:

a design is different between the unevenness of the reflective design portion and the unevenness of the transmissive design portion, the transmissive design portion includes:

a first base portion and a rib portion protruding from the first base portion to a thickness direction of the exterior member;

the rib portion comprises a plurality of protrusion portions; and a first design is formed in which the protrusion portions and recesses are arranged in a first and second direction, the reflective design portion includes:

a second base portion and a retraction portion that retracts from the second base portion to an inner side in the thickness direction of the exterior member;

the retraction portion comprises a plurality of recessed portions; and a second design is formed in which the recessed portions are arranged in a first and second direction;

each of the retraction portion includes a deepest portion and a plurality of inclined portions with the deepest portion positioned at a center of the recessed portion on an outer edge of the retraction portion;

the second base and the deepest portion are connected to each other by the inclined portions;

the design of the reflective design portion has a pattern in which a plurality of first motifs are arranged, the first motifs being formed by the unevenness of the reflective design portion;

the design of the transmissive design portion has a pattern in which a plurality of second motifs are arranged, the second motifs being different from the first motifs and formed by the unevenness of the transmissive design portion;

the first motifs are arranged in an in-plane direction of the reflective design portion;

the second motifs are arranged in an in-plane direction of the transmissive design portion; and each of the second motifs forming the design of the transmissive design portion is expressed larger than each of the first motifs forming the design of the reflective design portion.

2. The exterior member according to claim 1, wherein the reflective design portion and the transmissive design portion each have an uneven shape, and the transmissive design portion has an amount of unevenness greater than an amount of unevenness of the reflective design portion.

3. The exterior member according to claim 1, wherein the reflective design portion includes an embossed structure on the front surface portion.

4. The exterior member according to claim 1, wherein the exterior member contains a coloring material that absorbs the light transmitting the exterior member.

5. The exterior member according to claim 4, wherein transmittance of the exterior member is 20% or less.

6. The exterior member according to claim 4, wherein the coloring material is a black colorant.

7. A vehicle comprising:

an exterior part including the exterior member according to claim 1.

8. The exterior member according to claim 1, wherein the exterior member contains a coloring material and is formed as being translucent.

9. The exterior member according to claim 1, wherein the back surface portion is configured to reflect the at least part of light transmitted at the back surface portion where the unevenness is formed such that different parts of the back surface portion reflect differently the light emitted from the front surface portion and create a shade of color.

10. The exterior member according to claim 1, wherein the exterior member is configured as a single material from the front surface portion to the back surface portion.

11. The exterior member according to claim 1, wherein the unevenness of the front surface portion and the unevenness of the back surface portion are formed by molding.

12. A vehicle comprising:

an exterior part including the exterior member according to claim 1, wherein in a state where the exterior part is attached to the vehicle, the front surface portion is disposed to expose outward of the vehicle, and the back surface portion is disposed to face an interior space of the vehicle.

13. An exterior member having a light transmitting property, comprising:

a reflective design portion having unevenness provided on a front surface portion of the exterior member that is a side where light is incident from a light source located outside, the unevenness reflecting at least a part of light from the light source; and a transmissive design portion provided on a back surface portion of the exterior member that is an opposite side to the side where light is incident from the light source located outside, and the transmissive design portion having unevenness being configured to partially change a transmission amount of light, wherein:

a design is different between the unevenness of the reflective design portion and the unevenness of the transmissive design portion;

the transmissive design portion includes:

a first base portion and a rib portion protruding from the first base portion to a thickness direction of the exterior member;

the rib portion comprises a plurality of protrusion portions;

a first design is formed in which the protrusion portions and recesses are arranged in a first and second direction;

the reflective design portion includes:

a second base portion and a retraction portion that retracts from the second base portion to an inner side in the thickness direction of the exterior member;

the retraction portion comprises a plurality of recessed portions;

a second design is formed in which the recessed portions are arranged in a first and second direction;

each of the retraction portion includes a deepest portion and a plurality of inclined portions with the deepest portion positioned at a center of the recessed portions on an outer edge of the retraction portion;

the second base and the deepest portion are connected to each other by the inclined portions;

the transmissive design portion has an amount of unevenness greater than an amount of unevenness of the reflective design portion; and the transmissive design portion is formed at an angle steeper than that of the reflective design portion.

* * * * *